United States Patent
Alfredsson

(10) Patent No.: US 7,390,281 B2
(45) Date of Patent: Jun. 24, 2008

(54) GEARBOX FOR MOTOR VEHICLES

(75) Inventor: Sverker Alfredsson, Vastra Frolunda (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 10/605,932

(22) Filed: Nov. 6, 2003

(65) Prior Publication Data

US 2004/0106493 A1    Jun. 3, 2004

Related U.S. Application Data

(60) Provisional application No. 60/423,987, filed on Nov. 6, 2002.

(51) Int. Cl.
*F16H 3/44* (2006.01)
(52) U.S. Cl. ........................ 475/317; 475/204
(58) Field of Classification Search ................ 475/201, 475/204, 317, 320; 74/339
See application file for complete search history.

(56) References Cited

U.S. PATENT DOCUMENTS

| | | | | |
|---|---|---|---|---|
| 4,667,538 A * | 5/1987 | Larsson | ...................... | 475/299 |
| 4,821,591 A * | 4/1989 | Adler | ........................... | 74/339 |
| 5,346,442 A * | 9/1994 | Eastman | ...................... | 475/223 |
| 5,390,347 A * | 2/1995 | Buri et al. | ................... | 475/303 |
| 6,056,666 A * | 5/2000 | Williams | .................... | 475/320 |
| 6,824,493 B2 * | 11/2004 | Alfredsson | .................. | 475/299 |

FOREIGN PATENT DOCUMENTS

| JP | 2000-55077 | * | 2/2000 |
|---|---|---|---|
| WO | WO92/01173 | * | 1/1992 |

* cited by examiner

*Primary Examiner*—Ha Ho
(74) *Attorney, Agent, or Firm*—Novak Druce & Quigg, LLP

(57) ABSTRACT

Method and arrangement for providing a range gearbox with a planetary gear (1) for a motor vehicle that is configured to be connected to the output side of a basic gearbox. The ring gear (18) of the planetary gear is axially displaceable. The ring gear (18) can alternatively engage coupling rings (10, 16). A synchronizing ring (15) is intended to synchronize the rotational speed difference between the ring gear (18) and one or other coupling ring (10, 16). The synchronizing ring (15) and the coupling ring (16) are arranged coaxially outside the ring gear (18). Bars (25) for engaging the coupling ring (16) and bars (25, 25b) for driving said synchronizing ring (15) are arranged on the radially external side of the ring gear (18). The coupling ring (16) is arranged between the synchronizing ring (15) and the fork (27).

16 Claims, 3 Drawing Sheets

GEARBOX FOR MOTOR VEHICLES

CROSS REFERENCE TO RELATED APPLICATIONS

The present application claims the benefit of Provisional Application No. 60/423,987 filed 6 Nov. 2002, the disclosure of which is expressly incorporated herein by reference in its entirety.

BACKGROUND OF INVENTION

1. Technical Field

The present invention relates to a gearbox for motor vehicles, which is arranged between a basic gearbox and a transmission leading to driving wheels. The gearbox includes an input shaft from the basic gearbox, an output shaft to a transmission, and a planetary gear arranged between the input shaft and the output shaft. The ring gear of the planetary gear is axially displaceable. A first coupling ring for engaging a high-range mode, and a second coupling ring for engaging a low-range mode are provided. Utilizing the coupling rings, the ring gear can alternatively engage at least one synchronizing means with at least one friction surface. The synchronizing means is configured to synchronize the rotational speed difference between the ring gear and one or other coupling ring by interaction with a corresponding friction surface arranged on each coupling ring. The gearbox is intended to be capable of shifting between two gearings and thus, together with the basic gearbox, doubling the total number of gearing possibilities.

2. State of the Art

In transmission systems for heavy-duty vehicles, for example trucks and buses, it is known to connect an extra gearbox to the basic gearbox of the vehicle for the purpose of doubling the number of gearing possibilities. Such a gearbox is usually referred to as a range gearbox or an auxiliary gearbox. The range gearbox usually comprises (includes, but is not limited to) a planetary gear, by means of which the gearing can be changed between a high-range mode and a low-range mode. In the low-range mode, use is made of the gearing in the planetary gear, whereas, in the high-range mode, no transmission takes place through the planetary gear. In order to facilitate shifting between high-range mode and low-range mode, it is known to design such planetary gears with synchronizing means, usually comprising synchronizing rings, spring means for pre-synchronizing and blocking means to prevent engagement before synchronous rotational speed has been achieved.

In order to reduce the number of component parts and also from the point of view of power distribution, it has been found to be advantageous to use the ring gear of the planetary gear as a coupling sleeve. The ring gear can, by axial displacement, and after synchronization of the rotational speed difference between the ring gear and coupling rings, be brought into engagement with the coupling ring concerned on either side of the planetary gear. In this way different gearings are obtained. An example of an axially displaceable ring gear is shown in SE 514231. In that case, the ring gear is provided at each axial end with synchronizing means, and the internal teeth of the ring gear are extended so as to be capable of being coupled together with a corresponding coupling ring with coupling teeth arranged on each side of the ring gear. The ring gear and the synchronizing means on each side thus occupy more space in the axial direction.

When the ring gear in SE 514231 is coupled together with the gearbox casing, low-range mode is obtained, and the gearing in the planetary gear is used.

In order to obtain a shorter shifting time when synchronizing the rotational speed for the low-range mode, a greater synchronizing torque is required compared with synchronization for the high-range mode. A large diameter of the low-range synchronizing device is thus desirable in order to obtain a greater synchronizing torque. The diameter refers to the position of the synchronizing friction surfaces. In the range gearbox of SE 514231, the inside diameter of the ring gear limits the possibility of a large synchronizing diameter and thus a great synchronizing torque. Another disadvantage of known devices is that the overall length is in many cases too great and that double sets of annular springs with associated synchronizing rings are required.

The object of the present invention is to make synchronization for the low-range mode act on as large a diameter as possible in order to obtain more rapid shifts and also to shorten the overall length of the gearbox and reduce the number of component annular springs and synchronizing rings, while retaining good functioning. The object is also, when the axial displacement of the ring gear takes place, to separate friction surfaces in the synchronizing device with a relative speed difference; that is to say, the synchronizing device which is not functioning at the time, and in this way reduce the friction losses.

SUMMARY OF INVENTION

Arrangements configured according to the invention having a gearbox for motor vehicles, intended to be connected to the output side of a basic gearbox and comprising an input shaft from the basic gearbox, an output shaft to a transmission, a planetary gear arranged between the input shaft and the output shaft. The ring gear of the planetary gear can be displaced axially by a first means. The arrangement also includes a first coupling ring, for engaging a high-range mode, and a second coupling ring, for engaging a low-range mode, with which coupling rings the ring gear can engage alternatively. At least one synchronizing means is provided with at least one friction surface. The synchronizing means is intended to synchronize the rotational speed difference between the ring gear and one or other coupling ring by interaction with a corresponding at least one friction surface arranged on each coupling ring. The synchronizing means and the second coupling ring are arranged coaxially outside the ring gear. A second means for engaging the second coupling ring and a third means for driving said synchronizing means are arranged on the external side, seen radially, of the ring gear, and the second coupling ring is arranged between the synchronizing means and the first means.

Major advantages of arrangements configured according to the teachings of the present invention include that the shifting time, in particular when shifting to a low-range gear, is considerably shortened. The shorter shifting time is achieved on account of the greater synchronizing torque which is obtained by virtue of the invention making it possible to arrange the friction surfaces of the synchronizing ring along a larger diameter, seen from the center line of the input and output shafts. That is to say, the synchronizing ring is located coaxially outside the ring gear. Moreover, the overall length of the range gearbox is shortened, and only one annular spring and an associated synchronizing ring, that is to say a double synchronizing ring with two friction surfaces, are required.

According to an advantageous first embodiment of the arrangement configured according to the invention, the ring gear has on its external side, seen radially, bars for engaging the first coupling ring. The advantages are a short overall length, large synchronizing diameter and simple construction with few components.

According to an advantageous second embodiment of the arrangement of the invention, the internal teeth, seen radially, of the ring gear are used for engaging the first coupling ring. The advantages of this embodiment are that the external bars of the ring gear can be shortened somewhat and also that manufacture of the first coupling ring is made easier.

In a further advantageous third embodiment of the arrangement of the invention, the internal teeth of the ring gear are helical teeth. An advantage is that a servo effect is obtained when the gear concerned is engaged. The helical teeth, moreover, provide quieter operation.

BRIEF DESCRIPTION OF DRAWINGS

The present invention will be described in greater detail below with reference to the accompanying drawings which, for the purpose of exemplification, illustrate preferred embodiments of the invention and include the following.

DETAILED DESCRIPTION

Figure 1:
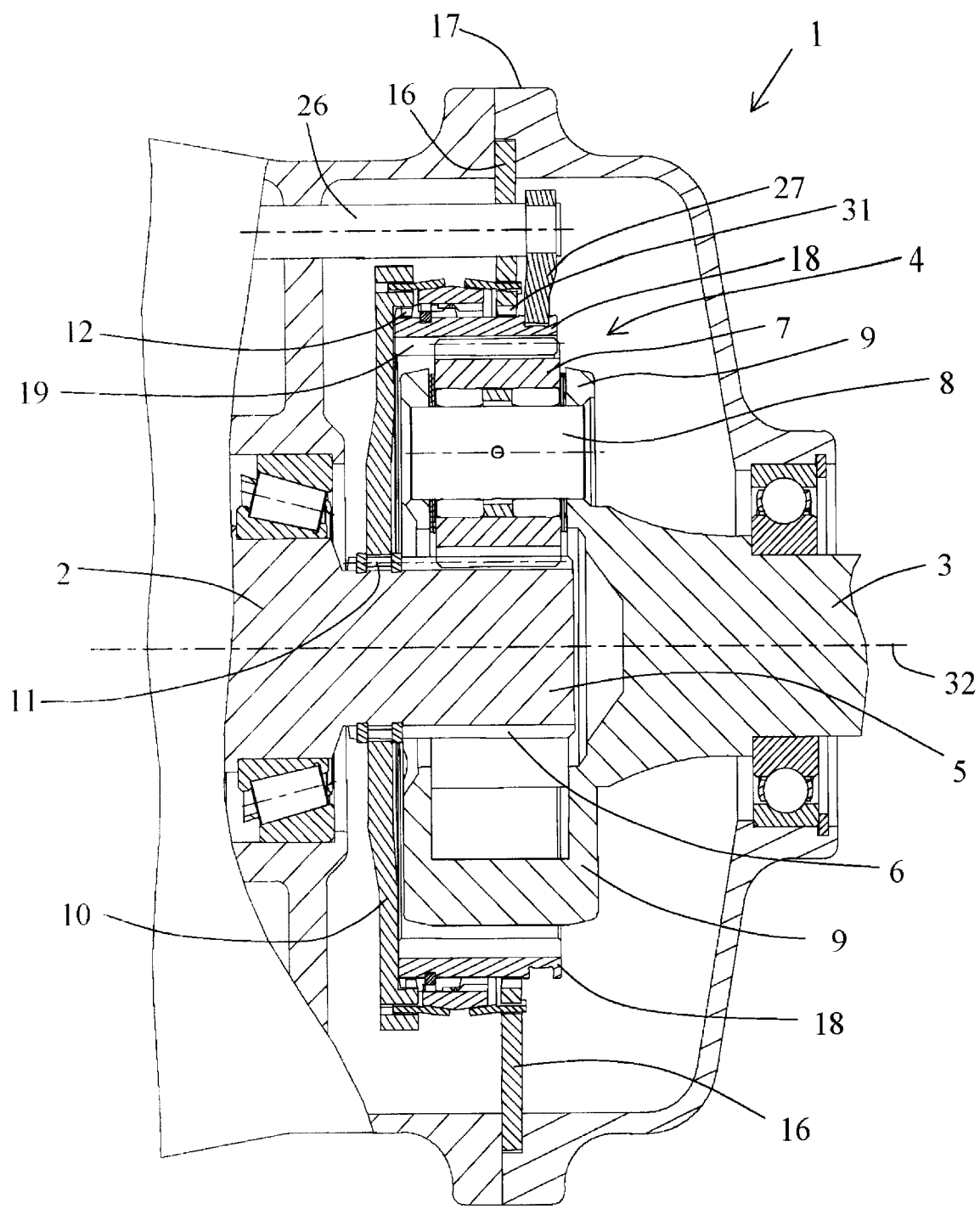
FIG. 1 is a cross-sectional view showing a longitudinal section taken through a range gearbox configured according to one embodiment of the invention, with the high-range mode (direct gear) engaged.
Figure 2:
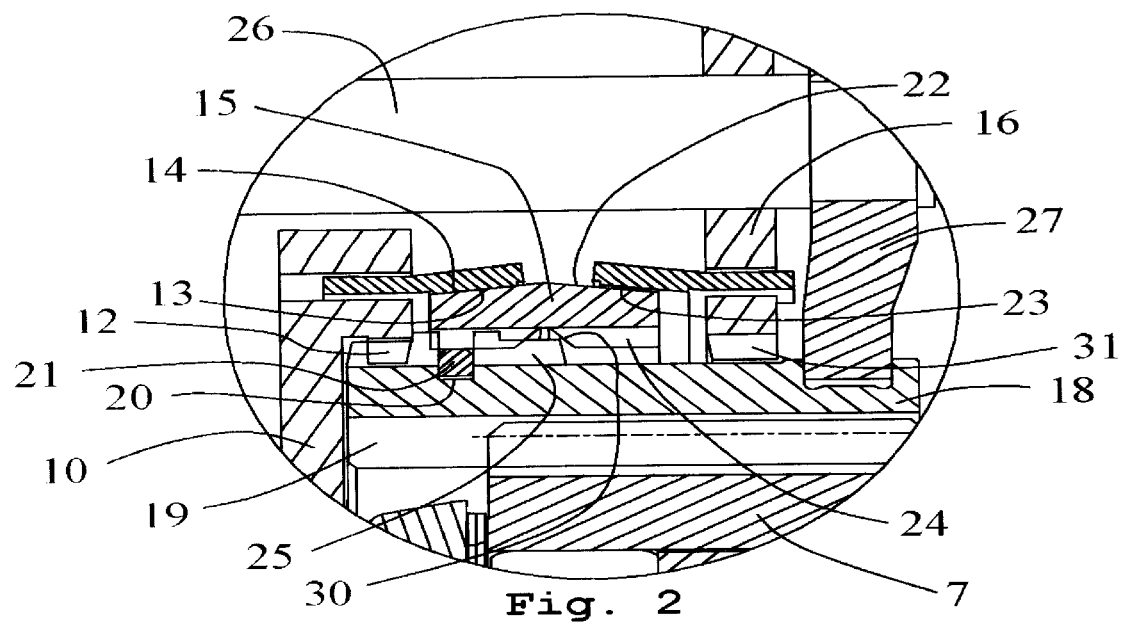
FIG. 2 is a detailed cross-sectional view showing an enlargement of part of the arrangement shown in FIG. 1.

FIG. 1 shows a gearbox 1 configured according to the invention and which can advantageously form a range gearbox 1 intended to be connected to the output shaft of a basic gearbox (not shown) in a heavy-duty vehicle, for example a truck or bus. The range gearbox comprises a planetary gear 4.

The output shaft of the basic gearbox forms the input shaft 2 of the range gearbox 1. The planetary gear 4 is arranged between the input shaft 2 of the range gearbox and an output shaft 3 from the range gearbox. The output shaft forms part of a transmission (not shown) which transmits driving power to the driving wheels of the vehicle. The driving power is therefore supplied from the engine of the vehicle, via the basic gearbox, the range gearbox and also via a transmission (not shown), to the driving wheels. A sun gear 5, forming part of the planetary gear 4, with external teeth 6 is mounted in a rotationally fixed manner on the input shaft. In the illustrative embodiment shown, the sun gear is integrated in the shaft 2. Alternatively, the sun gear can be attached to the shaft by means of splines. The sun gear is in engagement with a number of surrounding planet wheels 7 which are each mounted on their own pivot 8 in a planet-wheel carrier 9 which is in turn connected in a rotationally fixed manner to the output shaft 3. In the embodiment shown, the sun gear is also in rotationally fixed engagement with a first coupling ring 10 by means of internal teeth 11 on the coupling ring. The coupling ring 10 is arranged in a fixed manner relative to the sun gear in the axial direction and is provided with internal coupling teeth 12. Arranged on the coupling ring 10 is an inward-facing conical friction surface 13, the purpose of which is to interact with a corresponding outward-facing conical friction surface 14 on a synchronizing ring 15.

A second coupling ring 16 is arranged in a rotationally fixed manner and in a fixed manner in the axial direction relative to a gearbox casing 17 by means of, for example, external splines (not shown) arranged on the coupling ring 16 and also corresponding internal splines in the gearbox casing. Arranged on the coupling ring 16 is an inward-facing conical friction surface 23, the purpose of which is to interact with a corresponding outward-facing conical friction surface 22 on the synchronizing ring 15. In the exemplary embodiments shown, the synchronizing ring is a double synchronizing ring in that it comprises double friction surfaces 14 and 22.

The planet wheels 7 are also in engagement with the internal teeth 19 of a ring gear 18. The ring gear 18 has on its external side (as seen radially) a first circumferential groove 20 intended to receive an annular spring 21, the function of which is to transmit the pressing force from the ring gear to the synchronizing ring 15 when synchronization and shifting take place.

Figure 5:
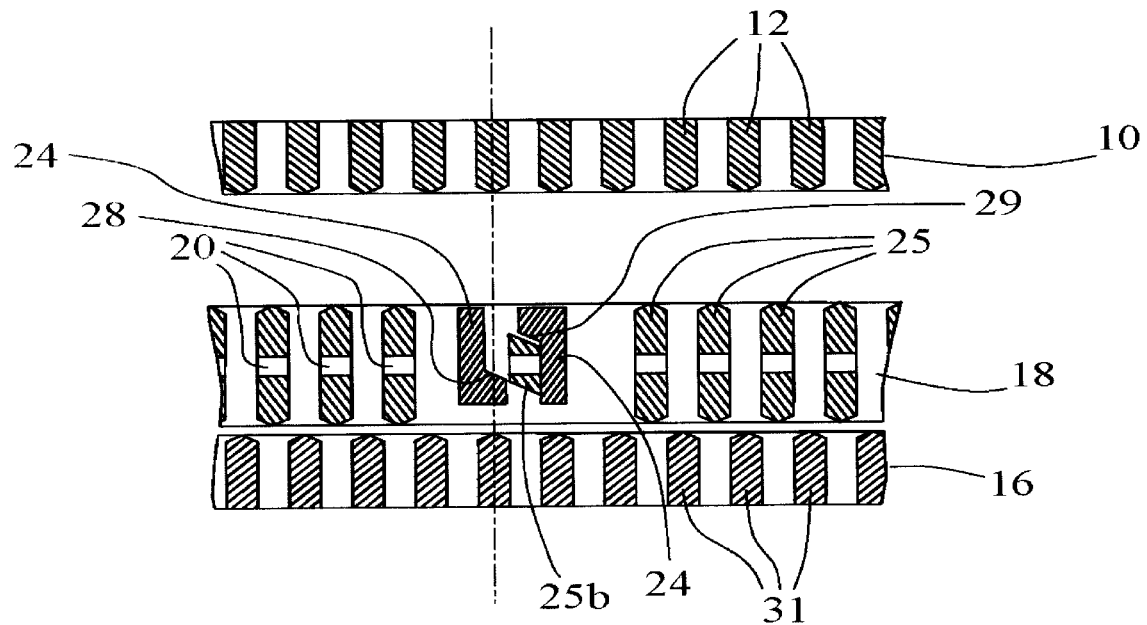
FIG. 5 is a diagrammatical view of external bars, blocking teeth and also the respective sets of coupling teeth.

Arranged on the external side (also as seen radially) of the synchronizing ring 15 are conical friction surfaces 14 and 22 which, when synchronization takes place, interact respectively with the corresponding conical friction surfaces 13 and 23 of each coupling ring. Arranged on the radially internal side of the synchronizing ring 15 are bars 24 which extend in the axial direction. The bars 24 are in engagement with corresponding external bars 25b on the ring gear 18. The bars 25b ensure that the synchronizing ring rotates with the ring gear 18; that is to say, driving takes place. However, the synchronizing ring 15 is at the same time limitedly rotatable relative to the ring gear 18. This is shown by FIG. 5, where the external bar 25b of the ring gear 18 allows only a certain rotation of the synchronizing ring 15 by virtue of the fact that the bars 24 stop against the bar 25b. A suitable number of bars 25b along the circumference of the ring gear includes six or nine. Other numbers are, however, also possible.

The ring gear 18 is used as a coupling sleeve and is thus axially displaceable between a high-range mode and a low-range mode. This means that the ring gear 18 is axially displaceable relative to the synchronizing ring 15, the planet wheels 7 and the coupling rings 10 and 16. The synchronizing ring 15 is also axially displaceable relative to the coupling rings 10 and 16.

FIG. 1 shows a range gear with the high-range gear engaged; that is to say, the ring gear 18 is engaged so as to rotate with the input shaft 2. When the driver selects the low-range gear by means of a range selector (not shown), an axial force is transmitted to the ring gear 18, which makes it move to the right in FIG. 1. The displacement of the ring gear 18 takes place via means for displacement of the ring gear. In the illustrative embodiment shown, the means consists of a rod 26 which is coupled to the range selector and is in turn connected firmly to a fork 27. The fork is connected rotatably to the ring gear 18, but is fixed in the axial direction relative to the ring gear 18.

The ring gear is first disengaged from the coupling teeth 12 of the coupling ring 10. The annular spring 21 accompanies the ring gear in its movement to the right in FIG. 1. The annular spring 21 is in its compressed or loaded state on the bars 24 of the synchronizing ring 15. The dimensions of the first circumferential groove 20 are determined by the dimensions of the annular spring 21 so that it has space when it is in its compressed state. When the ring gear 18 moves to the right, it takes the synchronizing ring 15 with it by virtue of the straining of the annular spring against the internal bars 24 of the synchronizing ring.

When the ring gear 18 and the synchronizing ring 15 have moved sufficiently far to the right that the conical friction surface 22 comes into contact with the corresponding conical surface 23 on the coupling ring 16, the annular spring 21 is inserted into the groove 30 of the synchronizing ring 15 and synchronization of the speed difference between the ring gear 18 and the coupling ring 16 begins. The speed of the coupling ring 16 is zero as it is connected firmly to the gearbox casing 17. On account of the speed difference between the ring gear and the coupling ring, the braking torque, that is to say the synchronizing torque, will rotate the synchronizing ring relative to the ring gear as much as the spacing between the two bars 24 with blocking surfaces 28 and 29 allows (see FIG. 5). The magnitude of the synchronizing torque is determined by, inter alia, the diameter on which the friction surfaces 13, 14, 22 and 23 are located. A larger diameter provides a greater synchronizing torque for a given axial force from the ring gear 18.

Figure 4:
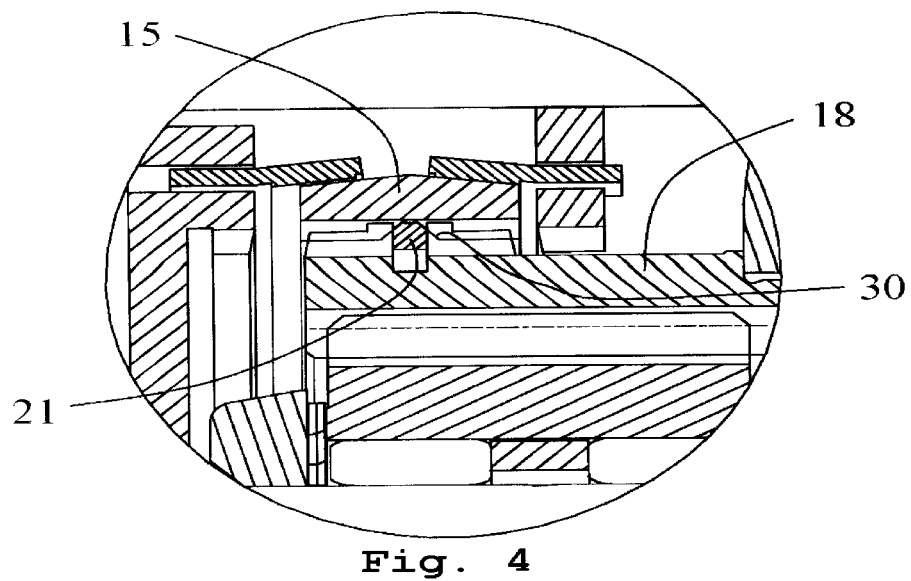
FIG. 4 is a detailed cross-sectional view showing an enlargement of part of the arrangement shown in FIG. 1, but in the phase of synchronization for low-range mode.

Blocking surfaces 28 and 29 are arranged on the synchronizing ring 15. In a known manner, the limited rotation of the synchronizing ring 15, relative to the ring gear 18 and the blocking surfaces 28, 29 on the synchronizing ring 15 ensure that the ring gear 18 is blocked against further axial movement before synchronous speed has been achieved. This is effected by one of the blocking surfaces 28 or 29, depending on the direction in which the ring gear 18 is to be displaced. FIG. 5 shows a situation just when synchronous speed has been achieved and the bars 25 of the ring gear enter the next step of being coupled together with the coupling teeth 31 on the coupling ring 16. When the blocking surfaces 28, 29 block further displacement, the ring gear 18 and the annular spring 21 have been displaced relative to the synchronizing ring 15 into a position which is shown in FIG. 4. Here, the annular spring 21 has taken up an expanded position in a second circumferential groove 30 arranged in the synchronizing ring 15.

Figure 3:
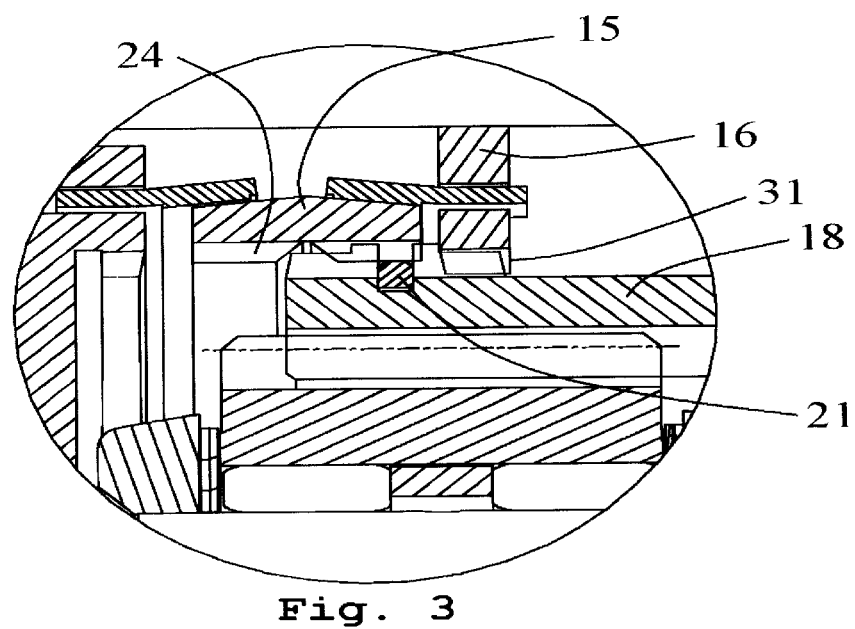
FIG. 3 is a detailed cross-sectional view showing an enlargement of part of the arrangement shown in FIG. 1, but with the low-range mode engaged.

During continued displacement of the ring gear 18, the annular spring 21 is compressed by interaction between the angled edge surfaces of the second circumferential groove 30 and the annular spring 21 and is finally displaced into a position part way up over the bars 24 (see FIG. 3). In this position, the synchronization work has been completed (see also FIG. 5), and the ring gear 18 can be brought into engagement with the coupling teeth 31 of the coupling ring 16 in order to lock the ring gear 18 in relation to the gearbox casing 17.

A corresponding procedure takes place when the ring gear 18 moves from low-range mode to high-range mode; that is to say, is displaced to the left in any of FIGS. 1 to 4.

The axial surfaces of the second groove 30 have an inclined angle adapted in order that the annular spring 21 will provide a certain pre-synchronizing force when axial movement of the ring gear 18 takes place. The annular spring can also have a corresponding angled edge surface configured so as to achieve optimum synchronization. It is also possible for the annular spring to be received by the second groove instead of the first. The first groove will then be provided with angled edge surfaces in a corresponding way, and the annular spring will jump in and out of the first groove instead in a corresponding way.

The internal teeth 19 of the ring gear can be helical teeth, which can provide a servo effect when the gear concerned is selected; that is to say, the moment of inertia in the gearbox helps to push the ring gear 18 in the axial direction. The external and internal bars on the ring gear and, respectively, the synchronizing ring and also the coupling teeth of the coupling rings can also be inclined in relation to the axial center line 32 of the ring gear. This means that when the range gear is engaged (low-range or high-range), balancing of the axial forces takes place. Balancing of the axial forces affords the advantage that the ring gear does not tend to move in the axial direction, and the fork 27 is thus not subjected to unnecessary stresses. The helical teeth moreover provide quieter operation.

The external bars on the ring gear, and also the positioning of the double synchronizing ring coaxially outside the ring gear contribute to the extremely short overall length of the gearbox casing. A greater synchronizing torque is obtained without the external shifting force, which is supplied via the rod 26 and the fork 27, having to be increased.

The invention is not limited to the gear arrangement described above. It is possible to use other types of resilient elements instead of an annular spring. The double synchronizing ring can be divided into two separate synchronizing rings, each with its own cone-shaped friction surface and its own second circumferential groove for receiving its own annular spring. In this embodiment, the ring gear will therefore have two first grooves. The grooves in each synchronizing ring ensure that the friction surfaces will not be in contact with one another for the synchronizing ring and coupling ring which are not functioning at the time. In this way, there are no friction losses or unnecessary wear.

The double synchronizing ring, which is made in one piece in the included illustrative embodiments, can be made from several assembled pieces.

In the illustrative embodiments shown, the friction surfaces in the coupling rings consist of sheet-metal cones which are, by means of fingers, arranged firmly in corresponding holes in the respective coupling ring. Alternatively the coupling rings can be made with integrated cones, which leads to a reduction in the number of component parts.

Alternatively, the coupling ring 10 can be connected firmly to the planet-wheel carrier 9 instead of the sun gear 5.

Furthermore, the coupling ring 10 can be made with external coupling teeth (as seen radially) which then instead engage the internal teeth 19 of the ring gear. In this embodiment, however, the conical friction surface 13 is arranged on the coupling ring in the same way as in the illustrative embodiments shown previously.

The invention claimed is:

1. A gearbox (1) for a motor vehicle and configured to be connected to an output side of a basic gearbox, said gearbox (1) comprising:
    an input shaft (2) from the basic gearbox, an output shaft (3) to a transmission, and a planetary gear (4) arranged between the input shaft (2) and the output shaft (3);
    the ring gear (18) of the planetary gear (4) is axially displaced by a first means (27) for instituting axial displacement of the ring gear (18);
    a first coupling ring (10) for engaging a high-range mode and a second coupling ring (16) for engaging a low-range mode, the ring gear (18) being alternatively engagable with the coupling rings (10, 16);
    at least one synchronizing means (15) with at least one friction surface (14, 22), the synchronizing means (15) being configured to synchronize rotational speed difference between the ring gear (18) and one of the coupling rings (10, 16) by interaction with a corresponding friction surface (13, 23) arranged on the respective coupling ring (10, 16);

the synchronizing means (15) and the second coupling ring (16) being arranged coaxially outside the ring gear (18);

at least one second means (25) for engaging at least the second coupling ring (16) and a third means (25, 25*b*) for driving said synchronizing means (15) are arranged on a radially external side of the ring gear (18) and the second coupling ring (16) is arranged between the synchronizing means (15) and the first means (27).

2. The gearbox as recited in claim 1, wherein the second means (25) is further engageable with the first coupling ring (10).

3. The gearbox as recited in claim 1, wherein at least one internal bar is arranged on a radially internal side of the ring gear (18) and corresponding coupling teeth on the first coupling ring (10) are arranged on the radially external side of the first coupling ring (10).

4. The gearbox as recited in claim 3, wherein said at least one internal bars in the ring gear (18) constitute at least a portion of internal teeth (19) of the ring gear (18) that interact with planet wheels (7) forming part of the planetary gear (4).

5. The gearbox as recited in claim 1, wherein the second means (25) and the third means (25, 25*b*) constitute a combined fourth means (25, 25*b*) for driving said synchronizing means (15) and for engaging at least one of the coupling rings (10, 16).

6. The gearbox as recited in claim 5, wherein bars (25, 25*b*) constitute at least one of: the second means (25), the third means (25, 25*b*) and the fourth means (25, 25*b*).

7. The gearbox as recited in claim 1, wherein at least one synchronizing ring (15) constitutes the synchronizing means (15).

8. The gearbox as recited in claim 7, wherein the at least one synchronizing rings (15) is assembled into a double synchronizing ring (15) engageable with the two coupling rings (10, 16).

9. The gearbox as recited in claim 1, wherein the ring gear (18) comprises, on a radially external side thereof, at least one first circumferential groove (20).

10. The gearbox as recited in claim 1, wherein the synchronizing means (15) comprises, on a radially external side thereof, at least one second circumferential groove (30).

11. The gearbox as recited in claim 1, wherein blocking surfaces (28, 29) are arranged on the synchronizing means (15) and are capable of blocking engagement of said coupling rings (10, 16) and the ring gear (18) before synchronous rotational speed is achieved.

12. The gearbox as recited in claim 1, wherein internal teeth (19) of the ring gear (18) are angled in a tangential plane in relation to the axial centerline (32) of the ring gear (18) thereby enabling a servo effect when axial movement of the ring gear (18) takes place, and said angling shows counter-clockwise displacement with increasing distance from one shaft end of the gearwheel (18).

13. The gearbox as recited in claim 12, wherein bars (25) arranged on the external side of the ring gear (18) and coupling teeth (31) arranged on the coupling ring (16) are angled in the tangential plane in relation to the axial centerline (32) of the ring gear (18) thereby balancing axial forces acting on the ring gear when the internal teeth of the ring gear are angled.

14. The gearbox as recited in claim 9, wherein the synchronizing means (15) comprises, on a radially external side thereof, at least one second circumferential groove (30).

15. The gearbox as recited in claim 14, wherein an essentially annular, radially resilient element (21) is arranged in at least one of the first (20) and second (30) grooves, the radially resilient element (21) being moveable into and out of the particular groove (20, 30) when the ring gear (18) is axially displaced relative to the synchronizing means (15).

16. The gearbox as recited in claim 15, wherein the radially resilient element (21) is an annular spring (21) having an interruption in a circumferential direction thereof.

* * * * *